UNITED STATES PATENT OFFICE.

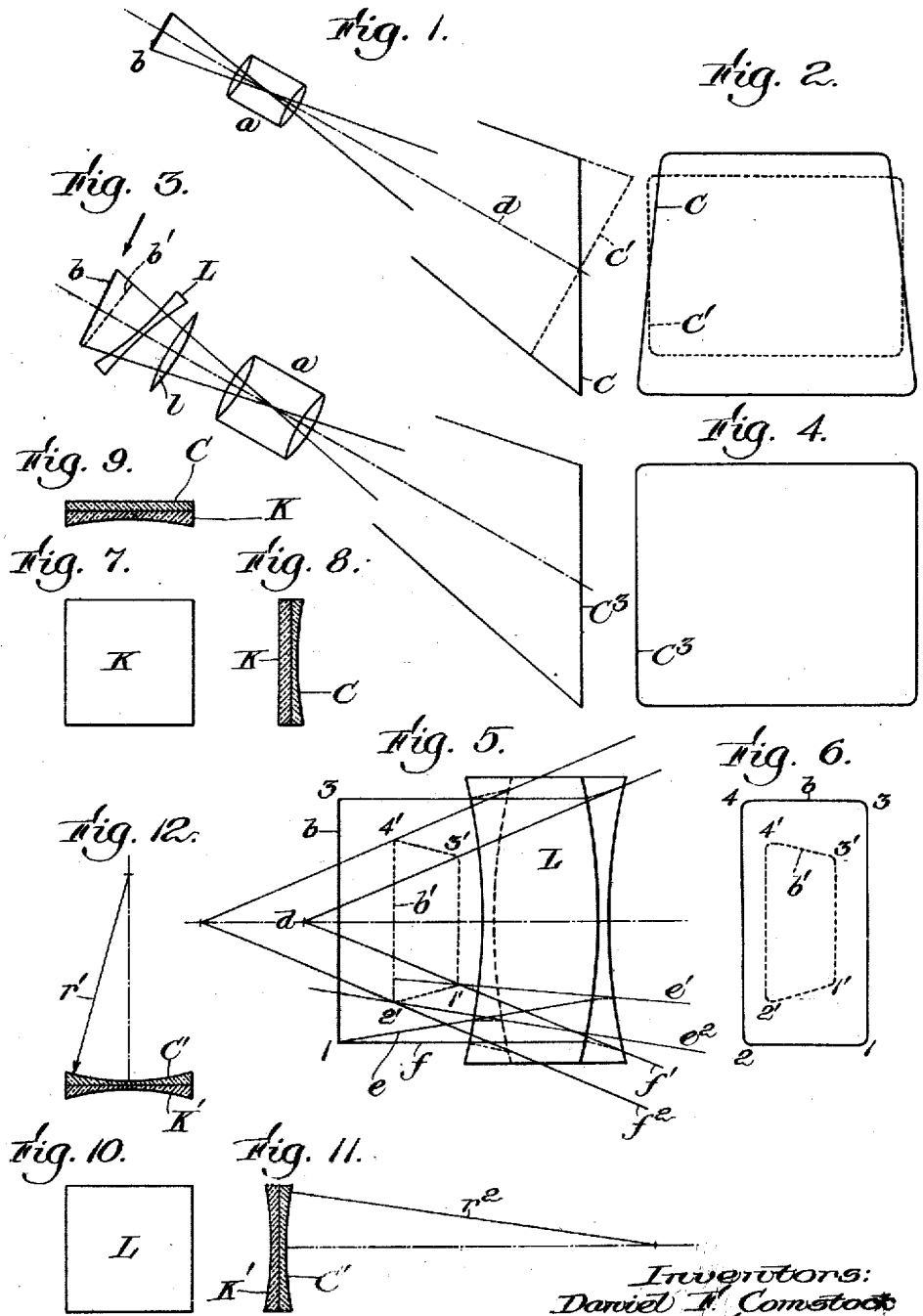

DANIEL F. COMSTOCK, OF BROOKLINE, AND OLIVER E. CONKLIN, OF BOSTON, MASSACHUSETTS, ASSIGNORS TO KALMUS, COMSTOCK & WESCOTT, INC., OF BOSTON, MASSACHUSETTS, A CORPORATION OF MASSACHUSETTS.

APPARATUS FOR NEUTRALIZING CERTAIN DISTORTION OF OPTICAL PROJECTIONS.

1,283,676.

Specification of Letters Patent.    Patented Nov. 5, 1918.

Application filed July 24, 1916.   Serial No. 110,818.

*To all whom it may concern:*

Be it known that we, DANIEL F. COMSTOCK and OLIVER E. CONKLIN, citizens of the United States, and residents, respectively, of Brookline, in the county of Norfolk, and Boston, in the county of Suffolk, State of Massachusetts, have invented new and useful Improvements in Apparatus for Neutralizing Certain Distortion of Optical Projections, of which the following is a specification.

This invention relates to light projection apparatus employed for projecting images on a screen which is oblique to the optical axis or to the central or average ray from the projector, and more particularly to a toric lens, or its equivalent, for overcoming "keystone" distortion without introducing astigmatism.

In the art of optically projecting upon a screen a magnified image of the photograph or other transparency, it has become the custom to place the optical lantern above the level of the point upon the screen which coincides with the middle of the picture, in order that the lantern may occupy less valuable space in the theater or hall than the point immediately opposite the screen which is usually required for seating purposes.

It is also customary to place the screen in an upright position substantially perpendicular to the normal line of vision to the average spectator. The resulting obliquity of incidence of the projection beam produces a distortion effect on the screen known as the "keystone" effect, so-called because a rectangular figure at the object or transparency is distorted in the projected image to a figure resembling an inverted keystone. This keystone effect is due to the fact that all parts of the screen where it intersects the rays are not equidistant from the projection lens, in other words, that the central ray is not normal to the screen; and since the rays of the beam leaving the projector diverge from the projector, the image on those parts of the screen more remote from the projector will be magnified to a greater extent than those parts nearer the projector. Horizontal parallel lines in the object remain parallel in the image, while vertical parallel lines in the object appear in the image on the screen not as being parallel but as converging toward a distant point in the plane of the screen and above the screen.

Moreover, with ordinary apparatus, the sharpness of definition also suffers from this obliquity owing to the fact that the true image produced in space is in a plane normal to the optical axis while the screen is in a plane oblique to the optical axis. Theoretically only that portion of the image is in focus on the screen which is defined by the intersection of the plane of the screen and the image plane.

For correcting the keystone distortion a tipped cylindrical lens may be employed to modify or reconstruct the lens system in such a way that the image defined by a screen perpendicular to the axis is no longer geometrically similar to the object but is distorted in such a way that it contains within it what might be called an "inverse keystone effect," that is, the distortion of the image beam is such as to show a keystone effect of an opposite kind to that which the unmodified lens system would produce on the oblique screen at the same point. Such a system is disclosed in the application of Daniel F. Comstock, Serial No. 35,196, filed June 21, 1915. While such cylindrical lens is effective to correct the keystone distortion, it has a tendency under certain severe practical conditions to cause the projected images to be astigmatic, that is, the horizontal and vertical lines of the image under certain conditions will not be in focus at the same plane for the reason that the cylindrical lens acts as a plane parallel plate of glass for the pairs of rays in a vertical plane, and as a lens for the pairs of rays in a horizontal plane. Thus the cylindrical lens tends to form two virtual images of the object, known as the primary and secondary images, with a blur spread all the way therebetween. The primary image contains the focus points of the vertical pairs of rays, and the secondary image contains the focus points of the horizontal pairs of rays. In the primary image the horizontal lines are sharply defined; while in the secondary image the vertical lines are sharply defined. Since the images are separated they cannot be projected on to the screen at the same time without some further correction, whence the image on the screen is astigmatic.

The principal object of our invention is to eliminate keystone distortion and at the same time to avoid astigmatism so as to obtain sharp definition over the entire screen. This we accomplish by employing, in the optical axis of the beam of light and preferably between the object or transparency and the objective lens, refracting means comprising a single lens, or a system of lenses, having different refracting powers in vertical and horizontal planes, respectively. Suitable refracting means for the purpose may comprise two or more crossed cylindrical lenses, cemented together or spaced apart, one or more cylindrical lenses and one or more spherical lenses, cemented together or spaced apart, one or more spherical lenses, toric lenses, etc., the lens or lenses being tipped relatively either to the object or transparency, the virtual image thereof, the optical axis of the system or the central ray of the projected beam of light, the axis of the objective, or the image screen, or tipped relatively to two or more of these.

In the accompanying drawings,

Figure 1 is a side elevation in diagram, partly broken away, showing the relation of projector and oblique screen in common use, which results in the keystone distortion of the projected image above described;

Fig. 2 is a face view in diagram of the keystone form of projected image caused by such distortion;

Fig. 3 is a side elevation similar to Fig. 1, showing in diagram a method of correcting such distortion;

Fig. 4 is a face view similar to Fig. 2, showing the form of the corrected projected image;

Fig. 5 is an enlarged view of a portion of Fig. 3 looking in the direction of the arrow, showing one method of producing a distorted virtual image for counteracting the distortion of the projected image by means of a negative toric lens;

Fig. 6 is a face view of the object or transparency showing its relation to the virtual image;

Fig. 7 is a face view of a double cylindrical lens;

Fig. 8 is a vertical sectional view of the double cylindrical lens;

Fig. 9 is a horizontal sectional view of the double cylindrical lens;

Fig. 10 is a face view of a negative toric lens;

Fig. 11 is a vertical sectional view of the negative toric lens; and

Fig. 12 is a horizontal sectional view of the negative toric lens.

Referring to Figs. 1 and 2, $a$ represents in conventional form the objective of an optical lantern, $b$ represents the transparency and $c$ represents the screen image. It will be noted that the central line $d$ of the light beam from the objective to the screen is not normal to the screen, consequently the projected image $c$ upon the screen will be in the shape of an inverted keystone as illustrated in Fig. 2, the lower part of the projected image $c$ being more remote from the optical lantern than the upper part, and therefore magnified to a greater extent. With the transparency or object $b$ normal to the central light beam $d$, the plane of the real image will also be normal to the central beam $d$, as shown at $c'$. There will be a consequent loss of definition of the image $c$ on the screen owing to the fact that the screen image $c$ is not in the same plane as the plane of the real image $c'$.

In order to produce a distortion of the virtual image to counteract the distortion of the projected image on the screen, a refracting element, or elements, is introduced between the transparency and the screen, preferably near the transparency, capable of magnifying or reducing the virtual image more at the bottom or at the top and more in one direction than in the other direction, namely, more in the direction of distortion of the screen image, which magnification or reduction, or both, are qualitatively and quantitatively suitable for neutralizing the distortion of the screen image.

One suitable type of refracting element may be made by combining with the single cylindrical lens described in the companion application above referred to, a second cylindrical lens, which we call the corrector element, positioned with its axis at right angles to the axis of the first lens, which we call the keystone element. The corrector element may be cemented on the side of the keystone element away from the object, and when of proper strength it causes the primary image to coincide with the secondary image. For best definition in the middle of the image the ratio of the power of the corrector element to the power of the keystone element is the square of the cosine of the angle at which the lens is tipped relative to the beam of light; but for best average definition over the entire screen the corrector element should be considerably weaker than this ratio. Good results have been obtained with a —8 diopter keystone lens and a —4.75 diopter corrector lens, with the lenses tipped forward. We have illustrated such a crossed cylindrical lens in Figs. 7 to 9, wherein K represents the keystone element curved about a vertical axis, and C represents the corrector element curved about a horizontal axis, the flat faces of the two elements being cemented together.

The toric lens is another and a preferred type of lens for producing the compensating inverted keystone effect. We contemplate using either a positive or a negative toric lens, the positive lens having at least one surface like the exterior surface of a torc or torus shell, and the negative lens having at least one surface like the interior surface of such a shell. A negative toric lens of suitable form, having both surfaces concave, is shown in Figs. 10 to 12. Toric surfaces have different curvatures in planes at right angles to each other, and toric lenses have different powers in these planes. Thus, in Figs. 10 to 12 the surface C' is represented as having a shorter radius of curvature, $r'$, in a horizontal plane than the radius of curvature, $r^2$, in a vertical plane. When used as a keystone lens, the horizontal section of the lens has the power necessary to produce the inverse keystone effect, and the vertical section has the power necessary to bring the primary and secondary images together, thus the horizontal and vertical sections of the toric lens perform, respectively, the functions of the keystone and corrector elements of the crossed cylindrical lens combination.

Figs. 3, 5 and 6 illustrate the effect of a negative toric lens when employed in one of the many ways within the scope of our invention. When using a negative toric lens the lens should be tipped forward relative to a normal to the optical axis, as shown, but when using a positive toric lens the lens should be tipped in the opposite direction. In either case a distorted virtual image similar to but opposite to that of the screen image is produced, as indicated diagrammatically at $b'$. The object $b$ may or may not be oblique to the optical axis, but as shown in Fig. 3 it is inclined backwardly at an angle of three degrees to the normal to the axis. Thus, in the modification illustrated, both the object and the compensating lens are oblique to the optical axis. However, it is within the scope of our invention to tip either the one or the other without tipping both.

The parts of the toric lens L nearest the object $b$ produce a certain magnification of the virtual image, depending on the distance of the lens from the object and on the focal length of the lens. The parts of the lens L at a greater distance from the object $b$ result in a decreased magnification and in a removal of parts of the virtual image farther from the transparency. By suitably choosing the strength of the lens (focal length) and the tip or inclination of the lens to the transparency, any reasonable magnitude may be given to the progressive magnification of the virtual image. In other words, the distortion effect which is desired may be obtained to any desired degree.

The relation of the object and virtual image are illustrated in Fig. 5, wherein the distance of the lens L from the object $b$, also the inclination of the lens L, and also the distance between object and virtual image, are exaggerated for the purpose of clearness. Assume a beam of light passing through point 1 of the object $b$, of which one ray $e$ passes through lens L and is refracted along the line $e'$, while another ray $f$ is refracted along the line $f'$. The virtual image of the point 1 will therefore appear at point 1' which is the intersection of the projection of the two lines $e'$ and $f'$. Similarly, beams passing through a point of the object $b$ immediately below the point 1 (indicated at 2 in Fig. 6) will pass along lines in the same vertical planes with $e$ and $f$, through the lower part of the lens L, and be refracted along lines $e^2$ and $f^2$. The virtual image of the point 2, therefore, will be at the intersection of projections of the lines $e^2$ and $f^2$ shown at 2'. The other corners 3 and 4 of the object $b$ in a similar manner produce virtual images 3' and 4'. The virtual image $b'$ is thus distorted and when projected upon the screen by a beam oblique to the screen appears as an undistorted image $e^3$ (Fig. 4) because the distortion of the virtual image $b'$ is equal and opposite to the distortion of the screen image due to the obliquity of the beam and therefore neutralizes it.

A suitable toric lens is one having a power of $-10$ diopters in the horizontal sections and $-8$ diopters in the vertical sections with the lens tipped forward, as shown in Fig. 3, 18 degrees and the film gate tipped backward 3 degrees. When using a negative lens an erect positive spherical lens $l$ may be employed to collect the rays emerging from the negative lens, but when using a positive lens an erect negative lens may be used to disperse the rays emerging from the positive lens.

It will be observed from the above disclosure of certain illustrative forms of our invention that one generic feature of the invention is a lens having different powers in planes at right angles to each other. This feature is present in lenses of various forms. For example, the lens may have curvature of one degree in one direction on one side and curvature of a different degree in the other direction on the other side, as the double crossed cylindrical lens; or, a different degree in the other direction on the same side, as a lens having one toric surface and one flat or spherical surface; or the lens may have one degree of curvature in one direction on one side and a different degree of curvature in the other direction on the same side, constituting a toric surface, and have a similar (although not necessarily the same) surface on the opposite side, as the negative toric lens shown in Figs. 10, 11 and 12. Furthermore, the lens may be convex on one or both sides.

The words "horizontal" and "vertical" as used throughout the specification and claims are to be understood to be used only in a relative sense, "horizontal" referring to the direction of keystone distortion (horizontal in Fig. 2) and "vertical" referring to the direction at right angles thereto in a plane perpendicular to the optical axis or central ray of the optical system (axis or ray $d$ in Fig. 1).

We claim:

1. Projection apparatus having an optical axis and means for holding the object to be projected, an objective lens, a screen in a plane oblique to the optical axis, and a toric lens in a plane oblique to the optical axis, for correcting keystone distortion.

2. Projection apparatus having an optical axis, and means for holding the object to be projected in a plane oblique to the optical axis, an objective lens, a screen in a plane oblique to the optical axis, and a lens having surfaces respectively curved different amounts in different directions, the lens being so disposed in the optical axis as to prevent keystone distortion of the image projected on the oblique screen.

3. Projection apparatus having means for holding the object to be projected, an objective lens, a screen in a plane oblique to the plane of the object, and a lens system comprising a surface having one degree of curvature about an axis parallel to both of said planes and a surface having a different degree of curvature about an axis perpendicular to the first axis, the lens system being tipped relatively to the object to be projected.

4. Projection apparatus having an optical axis and means for holding the object to be projected in a plane oblique to said axis, an objective lens, a screen in a plane oblique to the optical axis, and a lens having one surface curved in a horizontal direction and a second surface curved in a vertical direction, the lens being so disposed in the optical axis as to prevent keystone distortion of the image projected on the oblique screen.

5. Projection apparatus comprising an objective lens and refracting means having one operative surface curved in one direction and having a second operative surface curved in a direction at right angles to the first surface, the refracting means being oblique to the axis of the objective lens, whereby an image substantially free from keystone distortion may be produced in a plane oblique to the optical axis of the objective lens.

6. Projection apparatus having an optical axis and means for holding an object, a screen oblique to the optical axis, and a refracting element having two unequal curvatures, one about a vertical axis and the other about a horizontal axis, the element being oblique to the optical axis, whereby keystone distortion is corrected without introducing appreciable astigmatism.

7. Projection apparatus comprising means for holding an object, a screen tipped relatively to the object, an objective lens between the object and the screen, and a refracting element having two unequal curvatures, one about a vertical axis and the other about a horizontal axis, the element being tipped relatively to the object, whereby keystone distortion is corrected without introducing appreciable astigmatism.

8. Projection apparatus for producing on a screen which is oblique to the object, a magnified, substantially undistorted image of the object, comprising means for projecting a beam of light from the object to the screen, and means for distorting the beam substantially without introducing astigmatism and in such manner that an oblique section of the image beam in the image region is laterally magnified uniformly.

9. Projection apparatus for producing on a screen which is oblique to the object, a magnified substantially undistorted image of the object, comprising means for projecting a beam of light from the object to the screen, and a lens having surface curvature both in horizontal and vertical planes and being tipped relatively to the object for distorting the beam in such manner as to produce in a plane normal to the beam an image of varying lateral magnification of such extent that the lateral magnification on the oblique screen is uniform.

10. Projection apparatus for producing on a screen which is oblique to the object, a magnified substantially undistorted image of the object, comprising means for projecting a beam of light from the object to the screen, and a lens having surface curvature both in horizontal and vertical planes and being tipped relatively to the optical axis for distorting the beam in such manner as to produce in a plane normal to the beam an image of varying lateral magnification of such extent that the lateral magnification on the oblique screen is uniform.

11. Projection apparatus for producing on a screen which is oblique to the object, a magnified, substantially undistorted image of a transparency, comprising means for projecting a beam of light from the object to the screen, and means for refracting the beam substantially without introducing astigmatism and in such manner as to produce in a plane normal to the beam an image of varying lateral magnification of such extent that the lateral magnification on the oblique screen is uniform.

12. Projection apparatus for producing on a screen which is oblique to the transparency, a magnified, substantially undistorted image of a transparency comprising means for projecting a beam of light from the object to the screen, and means for producing, substantially without introducing astigmatism, a virtual image of the transparency distorted in a manner and to an extent proportional and opposite to the normal distortion of the projected image due to the obliquity of the screen.

13. Projection apparatus for producing a magnified, substantially undistorted image of a transparency on a screen which is oblique to the central ray of the beam of light striking the screen, comprising a toric lens tipped relatively to the transparency for refracting the rays of light passing from the object to the screen, whereby there is produced in a plane normal to the beam an image of varying lateral magnification such that the absolute magnification on the oblique screen is uniform.

14. Projection apparatus comprising an objective lens and refracting means having one operative surface curved in one direction and having a second operative surface curved in a direction at right angles to the first surface, the degrees of curvature of the two surfaces being different, the refracting means being oblique to the virtual image produced thereby, whereby an image substantially free from keystone distortion may be produced in a plane oblique to the axis of the objective lens.

15. Projection apparatus having an optical axis including a film gate, an objective lens, a screen, and refracting means having one surface curved about a horizontal axis and another surface curved a greater amount about a vertical axis, the screen and the refracting means being tipped relatively to the film gate about a horizontal axis.

16. Projection apparatus adapted to project on a screen an image free from keystone distortion comprising an objective lens and a toric lens, the toric lens being in the optical axis of the objective lens and having one axis at an oblique angle to the optical axis of the objective lens, the toric lens having greater power in one direction than in a direction perpendicular to the first direction.

17. Projection apparatus adapted to project on a screen an image free from keystone distortion comprising an objective lens and a toric lens in the optical axis of the objective lens, the toric lens being so disposed at an oblique angle with the optical axis as to eliminate the keystone distortion.

18. Projection apparatus adapted to project on a screen an image free from keystone distortion, comprising an objective lens and a toric lens in and oblique to the optical axis of the objective lens, and means for supporting the object to be projected in a plane oblique to the optical axis, the obliquity of the object and toric lens being so related as to eliminate keystone distortion.

19. Projection apparatus adapted to project on a screen an image free from keystone distortion, comprising negative lens means for compensating for keystone distortion, and a positive spherical lens for collecting light emerging from said lens means.

20. Projection apparatus having an optical axis and an object, a negative toric lens, a positive spherical lens, an objective lens, and a screen, the toric lens and the screen being oblique to the optical axis.

21. Projection apparatus wherein the screen and the object are oblique to the optical axis, having an objective lens, and a refracting element oblique to the optical axis for preventing keystone distortion and astigmatism.

22. Projection apparatus, wherein the screen is oblique to the optical axis, having an objective lens, and a refracting element oblique to the optical axis for preventing keystone distortion and astigmatism.

23. Projection apparatus adapted to project on a screen an image free from keystone distortion having an optical axis including a negative toric lens inclined at an angle to the optical axis, and a positive spherical lens.

24. Projection apparatus adapted to project on a screen an image free from keystone distortion comprising an objective lens and a toric lens in and oblique to the optical axis of the objective lens.

25. Projection apparatus adapted to project on a screen an image free from keystone distortion comprising a toric lens and an object, both within and oblique to the optical axis.

26. Projection apparatus adapted to project on a screen an image free from keystone distortion comprising a lens system, toric in character, and an object within and tipped at an angle to the optical axis.

27. Projection apparatus adapted to project on a screen an image free from keystone distortion comprising a lens system, toric in character within the optical axis and tipped relatively to the transparency.

28. Projection apparatus having means for holding the object to be projected, a screen in a plane oblique to the plane of the object, and a refracting element having different curvature in horizontal and vertical directions, respectively, the refracting element being between the object and the screen.

29. Projection apparatus having means for holding the object to be projected, a screen in a plane oblique to the plane of the object, and a lens between the object and the screen, the lens having a surface curved a greater amount in one direction than in the other direction.

30. Projection apparatus adapted to project on a screen oblique to the optical axis an image free from keystone distortion comprising an object oblique to the optical axis, and refracting means in the path of the projected image having different refracting powers in horizontal and vertical directions respectively.

31. Projection apparatus adapted to project on a screen an image free from keystone distortion comprising means for holding the object to be projected in a plane oblique to the optical axis, and a lens system in the path of the projected image having different powers in horizontal and vertical planes respectively.

Signed by us at Boston, Massachusetts, this 15th day of July, 1916.

DANIEL F. COMSTOCK.
O. E. CONKLIN.